(12) United States Patent
Fossum et al.

(10) Patent No.: US 7,633,717 B1
(45) Date of Patent: Dec. 15, 2009

(54) PRE-SHAPED HEAD SUSPENSION BASEPLATE FOR SWAGING DEFORMATION COMPENSATION

(75) Inventors: Randolph Edward Fossum, Richfield, MN (US); Shane J. Van Sloun, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 384 days.

(21) Appl. No.: 11/384,755

(22) Filed: Mar. 20, 2006

(51) Int. Cl.
*G11B 5/48* (2006.01)
*B32B 3/10* (2006.01)

(52) U.S. Cl. ............. 360/244.6; 428/131; 428/133

(58) Field of Classification Search ............ 360/244.6; 428/131–133, 596
See application file for complete search history.

(56) References Cited

U.S. PATENT DOCUMENTS

| | | | |
|---|---|---|---|
| 5,602,698 A | 2/1997 | Miyazaki et al. | |
| 6,046,885 A * | 4/2000 | Aimonetti et al. | 360/244.6 |
| 6,063,508 A | 5/2000 | Hanrahan et al. | |
| 6,372,314 B1 * | 4/2002 | Schmidt et al. | 428/34.1 |
| 6,372,315 B1 * | 4/2002 | Schmidt et al. | 428/34.1 |
| 6,399,179 B1 * | 6/2002 | Hanrahan et al. | 428/131 |
| 2003/0128473 A1 * | 7/2003 | Takagi et al. | 360/244.6 |
| 2005/0078407 A1 * | 4/2005 | Diewanit et al. | 360/97.01 |
| 2007/0050068 A1 * | 3/2007 | Sakairi | 700/98 |
| 2008/0002303 A1 * | 1/2008 | Wang et al. | 360/245.4 |

FOREIGN PATENT DOCUMENTS

JP 07-296534 A 11/1995

* cited by examiner

*Primary Examiner*—A. J. Heinz
(74) *Attorney, Agent, or Firm*—Faegre & Benson LLP (57) ABSTRACT

A baseplate has a flange and a boss tower with an opening for receiving a swaging ball during a swaging process. The flange has a pre-swaging profile that compensates for swaging-induced deformation of the flange. A portion of the baseplate is clamped into a flattened configuration and the flange is mounted to a suspension. The boss tower is inserted into an opening in an actuator arm. A swaging ball is passed through the swaging opening. The pre-swaging profile compensates for forces exerted on the flange during swaging such that deformation of the baseplate due to swaging is substantially eliminated.

16 Claims, 6 Drawing Sheets

PRE-SHAPED HEAD SUSPENSION BASEPLATE FOR SWAGING DEFORMATION COMPENSATION

TECHNICAL FIELD

The present invention relates generally to disk drive head suspension assemblies. More specifically, the invention is a baseplate for mechanically swaging a head suspension assembly to an actuator arm.

BACKGROUND

Swage baseplates are commonly used in disk drive or other dynamic data storage systems to attach head suspensions to actuator arms. Briefly, baseplates include a generally flat flange and a tubular boss tower extending from the flange. The boss tower is hollow and has an inner diameter defining a swaging opening and an outer diameter sized to fit within an opening in the actuator arm to which the suspension is to be mounted. Multiple actuator arms may be integrated into a single, stacked unit known as an e-block.

During the swaging process, a portion of the flange is clamped down and the flange is welded to a mounting region of the suspension. An actuator arm having an opening is positioned over the boss tower so that the actuator opening and the boss tower are concentrically aligned. A ball is forced through the swaging opening in the boss tower, bending the boss tower outwardly, thereby forcing the outer surface of the boss tower into frictional engagement with an inner surface of the opening in the actuator arm. The baseplate and attached suspension are thereby securely fastened to the actuator arm.

The boss towers of two baseplates, each attached to a suspension, can be inserted into an actuator opening, one boss tower entering the actuator opening from each end of the opening. A swage ball is passed through the boss towers to force the outer surfaces of both boss towers into tight engagement with the inner surface of the actuator opening. Thus, an actuator arm may carry two suspensions on opposite sides, one up and one down.

The baseplate boss towers thus extend in opposite directions with respect to the direction of passage of the ball through the swaging openings. For one baseplate, the ball is passed in a direction that tends to place the boss tower in compressive stress, while, for the other baseplate, the direction of passage of the ball is such as to tend to place the boss tower in tensile stress.

Unfortunately, the swaging process can result in deformation of the flange, which deforms the suspension to which the baseplate is mounted. Typically, the baseplate flange is manufactured to a flatness specification, which assumes zero flatness (totally flat) to be the optimal condition. Nonetheless, deformation does occur, and can cause changes in the desired positional orientation of the suspension, known as z-height variations, which affect spring characteristics of the suspension, creating gram load changes. These swaging-induced z-height variations and gram load changes can detrimentally affect the operational performance of the suspension.

Differences in boss tower designs and stresses between suspensions swaged in tension and compression on the same actuator can cause differences in gram load change between these up and down facing parts.

Sometimes during manufacturing the flange bows or deforms towards the boss tower ("positive" deformation) and sometimes the flange bows away from the boss tower ("negative" deformation). However, positive and negative deformation affect gram load differently. Thus, some baseplates have been manufactured with a slight curvature that is uniform about that boss tower to reduce variation. This curvature, while not reducing flange deformation, biases flange deformation in a selected direction (usually positive). Generally, the flange is curved such that an outermost tip of the flange is displaced by a maximum of approximately 0.0005".

A need exists for a swaging assembly that counteracts the deformation forces on attached components following swaging.

SUMMARY

In one embodiment, the present invention is a baseplate of the type having a flange and a boss tower with an opening for receiving a swaging ball during a swaging process. The flange has a pre-swaging profile that compensates for swaging-induced deformation of the flange.

In another embodiment, the present invention is a method of assembling a disk drive suspension assembly. A baseplate is provided, wherein the baseplate is of the type having a flange and a boss tower with an opening for receiving a swaging ball during a swaging process. Furthermore, the flange has a pre-swaging profile that compensates for swaging-induced deformation of the flange. A portion of the baseplate is clamped into a flattened configuration and a swaging ball is passed through the opening. The baseplate is then released. The pre-swaging profile compensates for forces exerted on the flange during swaging such that deformation of the baseplate due to swaging is substantially eliminated.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
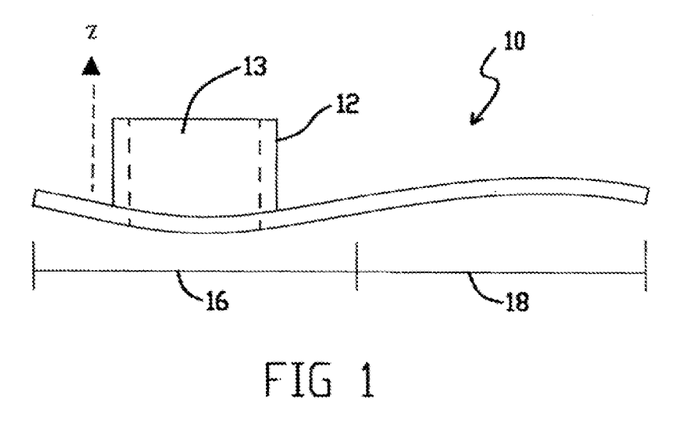
FIG. 1 shows a cross-sectional view of an exemplary baseplate in relation to embodiments of the present invention.
Figure 2:
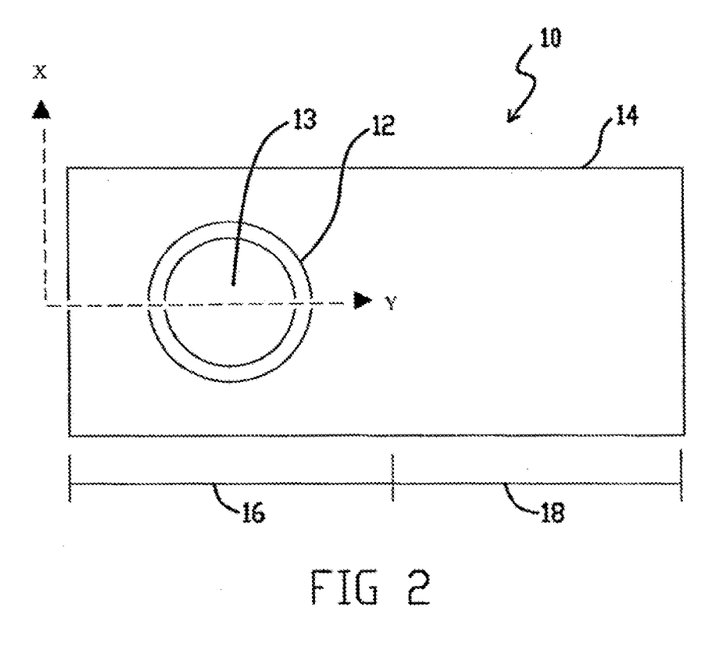
FIG. 2 is a top view of the baseplate of FIG. 1.

FIGS. 1 and 2 show a baseplate 10 according to an embodiment of the present invention. Baseplate 10 has a boss tower 12 extending from a flange 14. The boss tower 12 defines a swaging opening 13. The flange 14 includes a clamp region 16 surrounding the boss tower 12 and a tip region 18 that extends from the clamp region 16 and is distal to the boss tower 12 relative to the clamp region 16. The tip region 18 is that portion of the baseplate 10 that overhangs the actuator arm following installation.

The flange 14 is formed with a pre-swaging profile. The flange 14 pre-swaging profile is shown most clearly in FIG. 1 as a displacement or curvature in the z-axis, i.e., a direction parallel to the axis of the boss tower 12 and perpendicular to the plane of the flange 14. While the pre-swaging profile of the flange 14 of FIG. 1 is curvilinear, a baseplate in accordance with the present invention may have a pre-swaging profile that is planar, angled, includes convex or concave curvatures, or any combination thereof.

In one embodiment, as shown in FIG. 1, the clamp region 16 has a first overall profile and the tip region 18 has a second overall profile that differs from the first profile. This provides the baseplate 10 with a complex or multi-directional pre-swaging profile. In the present embodiment, first profile of the clamp region 16 is generally concave with respect to the boss tower 12 while the second profile of the tip region 18 is generally convex with respect to the boss tower 12.

The tip height of the flange 14, or the displacement of the outermost tip of the flange 14 due to the pre-swaging profile, may be up to approximately 0.0016". The maximum displacement of any portion of the flange 14 due to the pre-swaging profile may be up to approximately 0.003". Where the flange 14 is formed with regions of both concave and convex curvature, as shown in FIG. 1, the tip height may approach zero, even though other portions of the flange 14 may be vertically displaced.

Forming the baseplate 10 with the pre-swaging profile pre-stresses the baseplate 10, and in particular the flange 14. This pre-stressing compensates for forces and stresses exerted on the baseplate 10 during the swaging process. In one embodiment, the pre-swaging profile pre-stresses the baseplate 10 such that at clamping, residual stresses counteract or compensate for subsequent stresses and forces exerted on the baseplate 10 at swaging. The pre-swaging profile of the baseplate 10 thus reduces or eliminates swaging-induced deformation. This in turn reduces or eliminates suspension gram changes and z-height variations.

The baseplate 10 is attached to the suspension through a multi-step process. Typically, the baseplate 10 is stamped or shaped by and is mounted to a suspension. An actuator arm having an opening is positioned over the boss tower 12 so that an opening in the actuator and the boss tower 12 are concentrically aligned. (Not shown) During the swaging process, a ball is forced through the swaging opening 13 in the boss tower 12, bending the boss tower 12 outwardly, thereby forcing the boss tower 12 into frictional engagement with an inner surface of the opening in the actuator arm. (Not shown) This results in the actuator arm bending.

Clamping causes the pre-swaging profile of the baseplate 10 to elastically deform, generating residual forces which compensate for forces exerted on the baseplate 10 during subsequent swaging and actuator arm bending. This compensation is such that swaging-induced plastic deformation of the baseplate 10 is reduced or eliminated.

Figure 3:
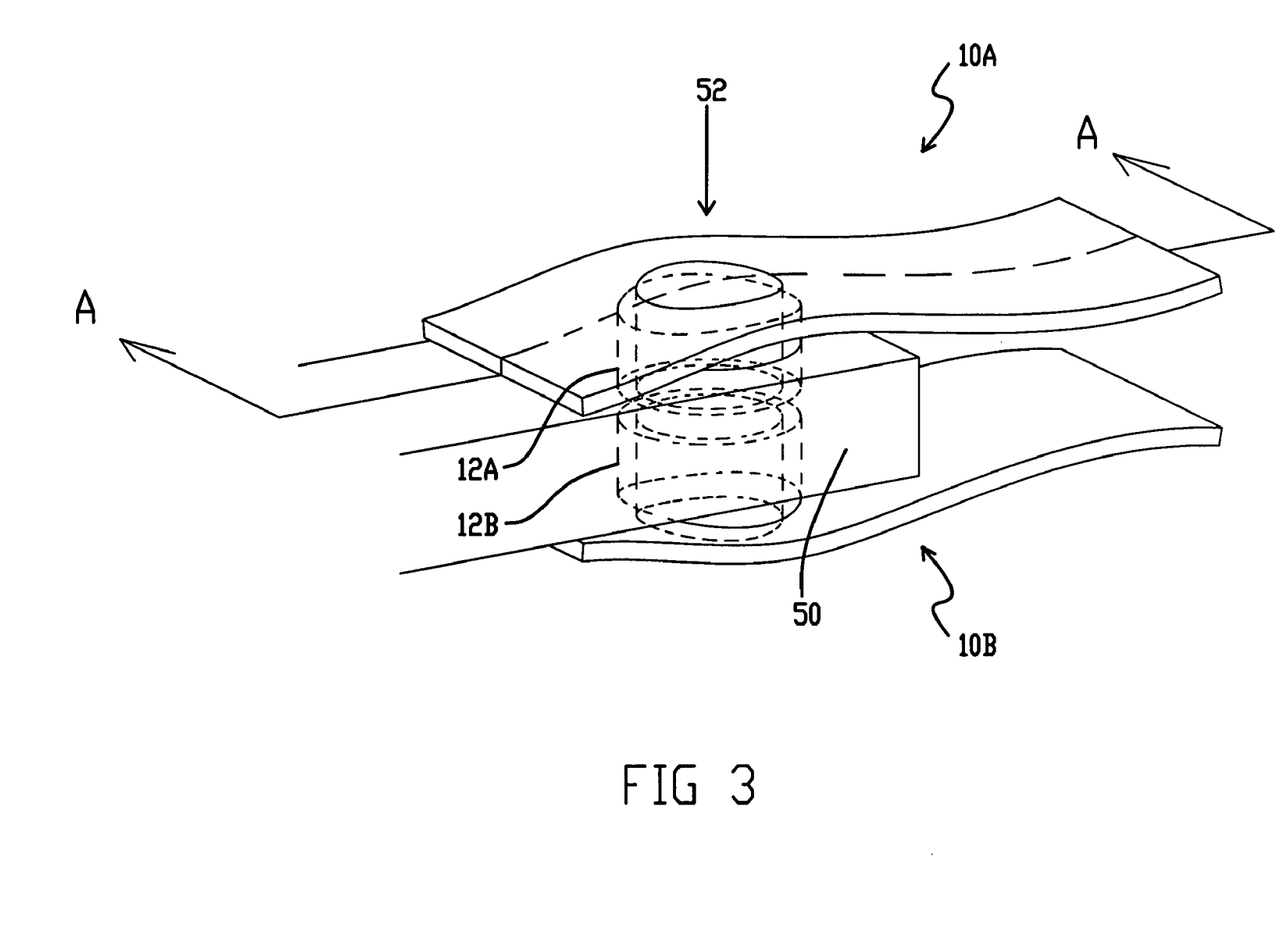
FIG. 3 shows a pair of baseplates as shown in FIG. 1 mounted on opposite sides of an actuator arm.

FIG. 3 shows a pair of baseplates 10a and 10b as shown in FIGS. 1 and 2 installed on opposite sides of an actuator arm 50. The direction of the swaging ball is indicated by arrow 52. Thus, baseplate 10a will be swaged in tension while baseplate 10b will be swaged in compression.

Figure 4:
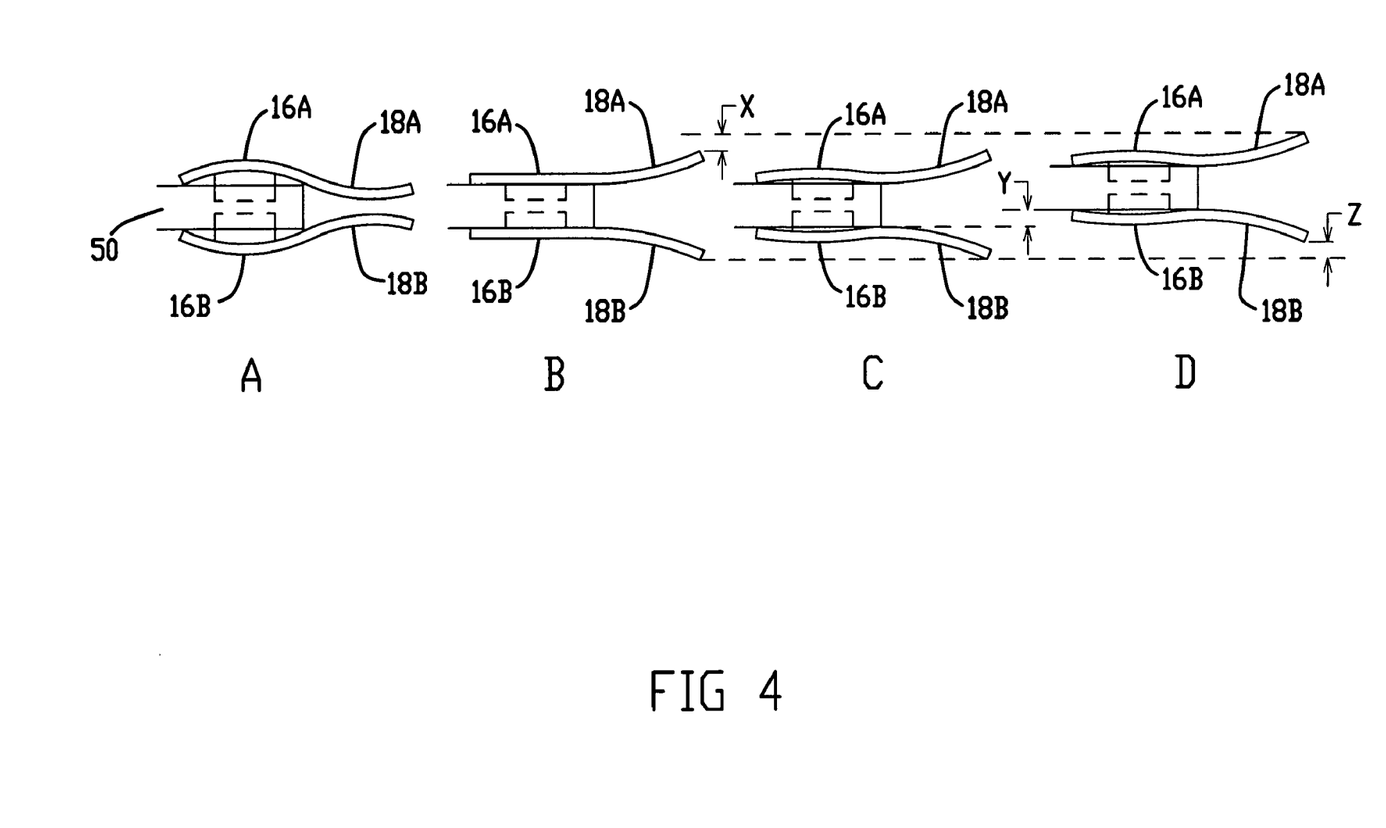
FIG. 4 shows the profiles of the flanges of FIG. 3 taken along section line A at different stages in a swaging procedure.

FIG. 4 shows changes in the profiles of the flanges 14a and 14b at different stages in a swaging procedure. Segment A shows the flange 14 in an initial state in which the baseplate 10 has the pre-swaging profile as shown in FIG. 3. Segment B shows the flange 14 after the clamp region 16 has been clamped into place. Thus, the clamp region 16 of the flange 14 is forced to a flattened shape while the tip region 18 is free. Segment C shows the flange 14 in a swaged condition, in which a swaging ball has been forced through the swaging opening 13 (not shown). Finally, Segment D shows the flange 14 following actuator arm bending.

A convenient method for evaluating deformation of the baseplate 10 is to measure tip height, or displacement of the outermost tip of the flange 14 from a reference position. Typically, deformation of the baseplate 10 is measured with respect to the profile of the baseplate 10 in the clamped configuration. Generally then, as shown in Segments A-D, changes in tip height, shown at various stages as x, y and z, are measured from the clamped stage shown in Segment B rather than the initial stage shown in Segment A. Comparing Segments A-D illustrates the effect clamping, swaging and actuator arm bending have on the profile of the flange 14. As shown, deformation of the baseplate 10 following swaging and actuator arm bending relative to the clamped stage is minimal.

Baseplates may have different sizes, shapes and thicknesses. The size and position of the boss tower and internal boss tower geometries relative to the flange may change. The flange 14 may have an irregular shape or may include other features. The variations in baseplate configuration are virtually limitless and for each baseplate, a different pre-swaging profile may be required to compensate for swaging-induced deformation. For example, in the embodiment shown generally in FIG. 1, the pre-swaging profile is asymmetric relative to the boss tower 12. However, in other embodiments, the pre-swaging profile is generally symmetric about the boss tower, other axes or is irregular. It is also possible that the clamp region is symmetric and the tip region is asymmetric. Furthermore, whether the baseplate is being swaged in tension or compression, or whether multiple baseplate are being swaged in the same actuator opening can impact the necessary pre-swaging profile. In addition, the top and bottom baseplates on an e-block structure may have different pre-swaging profile than those baseplates on interior sections of the e-block.

Figure 5:
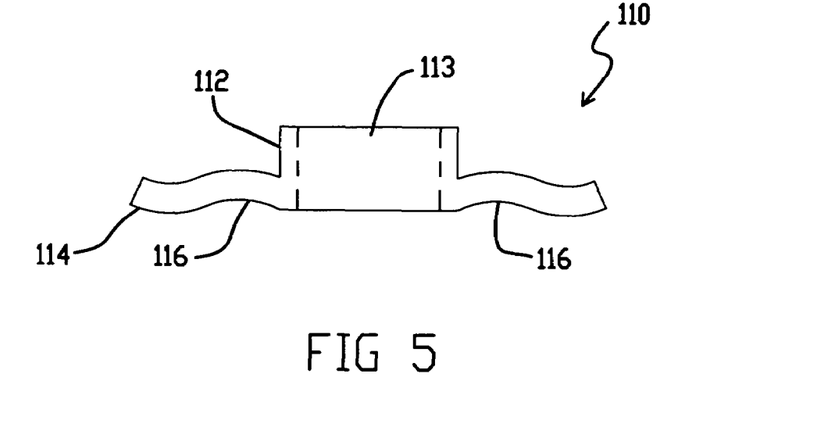
FIG. 5 is a cross-sectional view of a baseplate in relation to another embodiment of the present invention.
Figure 6:
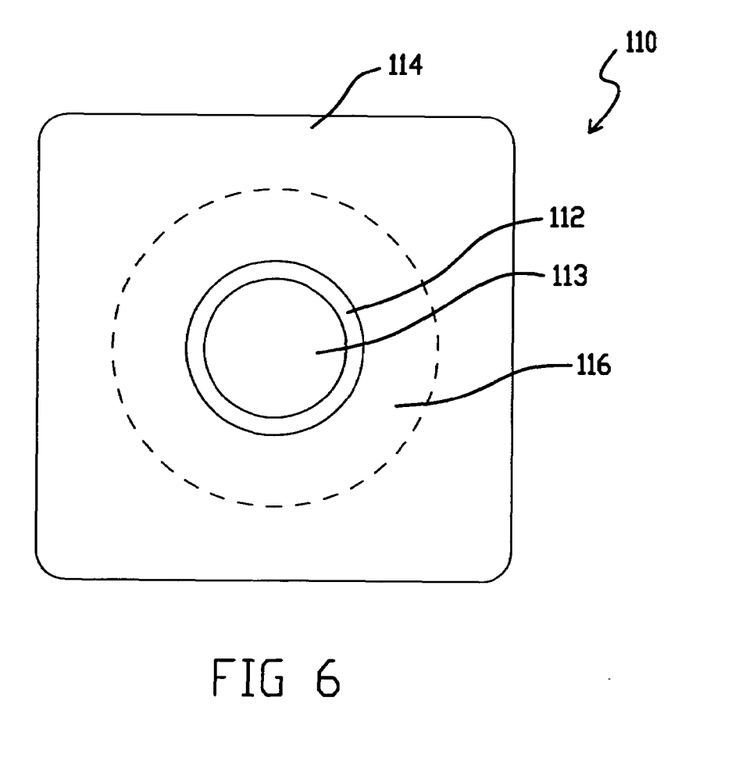
FIG. 6 is a top view of the baseplate of FIG. 4.

FIGS. 5 and 6 show a baseplate 110 according to another embodiment of the present invention which illustrates the effect some of these variations has on the pre-swaging profile. Baseplate 110 has a boss tower 112 extending from a flange 114. The boss tower 112 defines a swaging opening 113. The flange 114 includes a clamp region 116 surrounding the boss tower 112. Baseplate 110 is generally square and lacks a tip region as shown in the embodiments discussed with respect to FIGS. 1 and 2. As shown in FIG. 5, the flange 114 is formed with a pre-swaging profile that compensates for swaging-induced deformation of the flange 114. Unlike the embodiment shown generally in FIGS. 1 and 2, the pre-swaging profile of baseplate 110 is symmetric about the boss tower 112.

Figure 7:
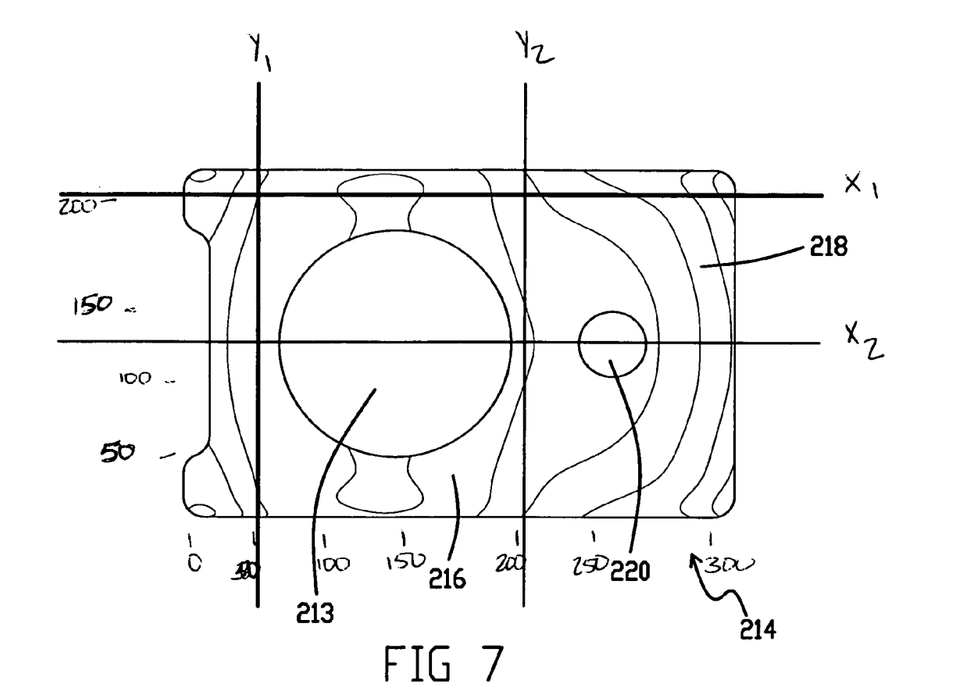
FIG. 7 is a top view of a baseplate in which vertical displacement of the flange is shown in color scale.
Figure 8:
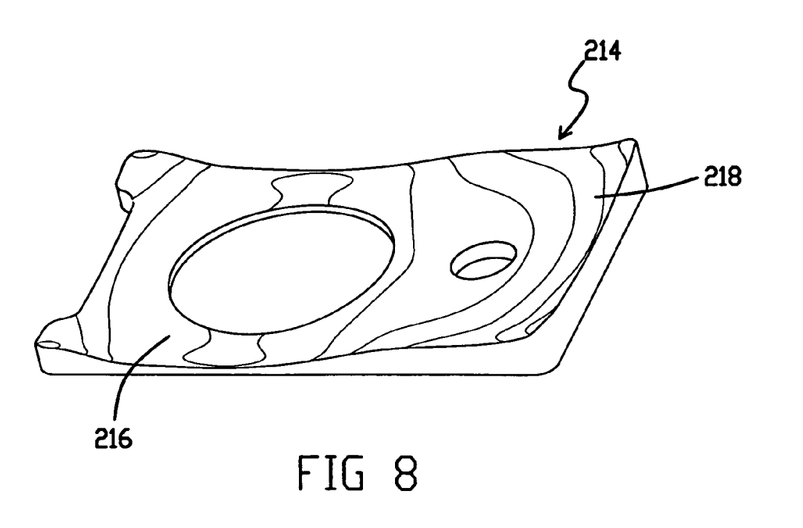
FIG. 8 is a topographical view of the baseplate of FIG. 7 shown in perspective.

FIGS. 7 and 8 are topographical views of a flange 214 according to another embodiment of the invention which further illustrates the effects baseplate configuration on the pre-swaging profile. The flange 214 includes a clamp region 216 and a tip region 218. The boss tower is not shown for clarity, although a swaging opening 213 is shown. The flange 214 further includes a secondary opening 220. Secondary opening 220 may be positioned to accommodate protruding features of the suspension or actuator arm, to reduce the mass of the baseplate, or serve still some other purposes.

The flange 214 is provided with a pre-swaging profile that compensates for swaging-induced deformation. FIG. 7 illustrates the complex pre-swaging profile that is needed to compensate for swaging-induced deformation for that particular baseplate.

Figure 9:
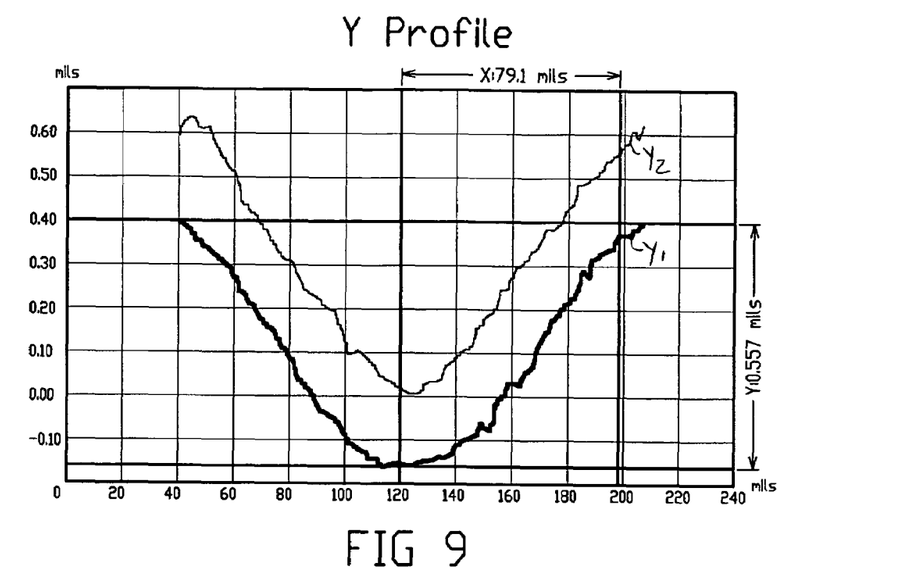
FIG. 9 is a Y-profile graphical representation of the clamp region and tip region of the baseplate of FIG. 7.
Figure 10:
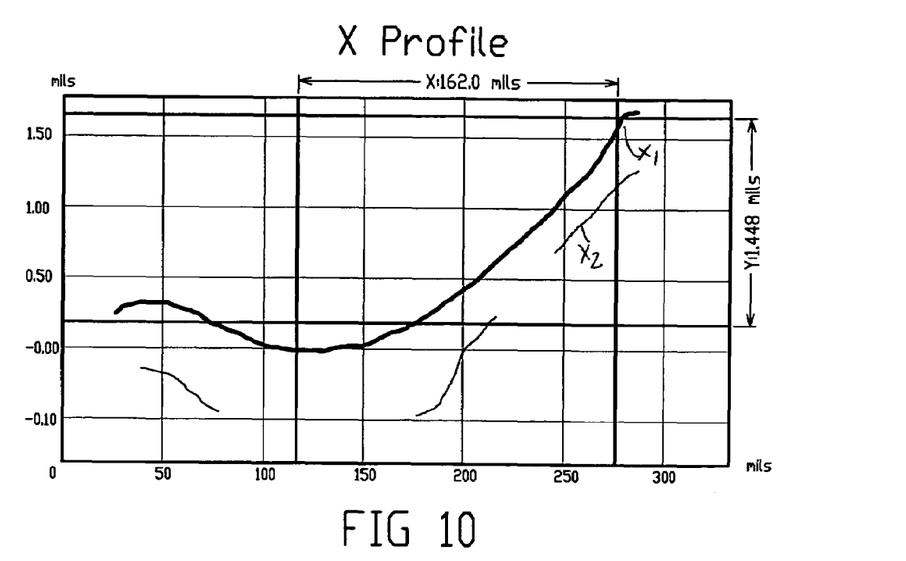
FIG. 10 is a X-profile graphical representation of peripheral and central portions of the baseplate of FIG. 7.

FIGS. 9 and 10 are graphs illustrating the cross-sectional pre-swaging profile of the baseplate 214 of FIGS. 7 and 8 along Y and X axes, respectively. FIG. 9 shows the pre-swaging profile of the baseplate 214 along the Y-axis at the clamp region 216 and tip region 218. FIG. 10 shows the pre-swaging profile of the baseplate 214 along the X-axis at peripheral and central regions, respectively.

In another embodiment, the present invention is a method of determining a pre-swaging profile that compensates for swaging-induced deformation of a given baseplate. In one embodiment, a plurality of potential baseplate pre-swaging profiles are analyzed using algorithms and a pre-swaging profile predicted to compensate for forces imparted on a baseplate during swaging is selected. Such analysis may be carried out using a variety of algorithms, including Finite Element Analysis procedures. The predicted optimum pre-swaging profile is determined and a baseplate is formed with the selected pre-swaging profile. A swage test characterization of the baseplate is performed, in which attachment of the baseplate and a suspension to an actuator arm via swaging is simulated or actually performed. Deformation of the baseplate is then mapped. Mapping reveals changes in the profile of the baseplate at various stages in the swaging procedure. Based on the deformation map, it is determined whether the selected pre-swaging profile satisfactorily compensated for forces imparted on the baseplate during the swage test characterization. If the selected pre-swaging profile did not perform satisfactorily, such information is employed to predict an improved baseplate pre-swaging profile. These steps are repeated until a satisfactory pre-swaging profile is determined.

In another embodiment, a "trial and error" approach is employed. Thus, a plurality of baseplates with differing pre-swaging profiles are formed. This is done without significant preliminary analysis as described with respect to the previous method. A swage test characterization is performed on each of the baseplates and deformation of each of the baseplates is mapped. It is then determined if any of the curvature profiles satisfactorily compensated for forces imparted on the corresponding baseplate during the swage test characterization. If none of the selected pre-swaging profiles was satisfactory, a plurality of new pre-swaging profiles are selected or predicted to do well based on the pre-swaging profile that performed the best or provided better results that the remainder. These steps are repeated until a satisfactory pre-swaging profile is determined.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A baseplate of the type having a flange defined by x and y axes and a boss tower with an opening extending in a z-axis direction with respect to the flange for receiving a swaging ball during a swaging process that causes deformation of the flange in the z-axis direction, wherein the flange has a pre-swaging z-axis direction profile that compensates for swaging-induced deformation of the flange during the swaging process and wherein the pre-swaging profile along a y-axis extending along the flange and through a center of the opening is asymmetric with respect to the center of the opening.

2. The baseplate of claim 1, wherein the pre-swaging profile causes the flange to have a reduced deformation in the z-axis following the swaging process.

3. The baseplate of claim 1, wherein the pre-swaging profile comprises a region of the flange curved in a generally convex shape relative to the boss tower.

4. The baseplate of claim 1, wherein the pre-swaging profile comprises a region of the flange curved in a generally concave shape relative to the boss tower.

5. The baseplate of claim 1, wherein the pre-swaging profile compensates for swaging-induced deformation of the flange due to compression swaging.

6. The baseplate of claim 1, wherein the pre-swaging profile compensates for swaging-induced deformation of the flange due to tension swaging.

7. The baseplate of claim 1, wherein the pre-swaging profile comprises regions of the flange having varying profiles.

8. The baseplate of claim 1 wherein the flange includes a clamp region and a tip region, and the clamp region of the flange has a first pre-swaging profile and the tip region of the flange has a second pre-swaging profile different from the first pre-swaging profile.

9. The baseplate of claim 8 wherein the first pre-swaging profile and the second pre-swaging profile are chosen such that deformation of the tip region from a first position to a second position is reduced, wherein in the first position the clamp region of the baseplate is clamped to a flattened configuration and in the second position a swaging ball has been passed through the boss tower opening.

10. The baseplate of claim 1 wherein the pre-swaging profile is chosen such that the flange is substantially flat following the swaging process.

11. The baseplate of claim 1 wherein the pre-swaging profile is chosen such that the baseplate exerts a reduced gram change on an attached suspension assembly component following swaging.

12. The baseplate of claim 1 wherein the pre-swaging profile is chosen such that the baseplate exerts-substantially zero gram changes on an attached suspension assembly component following swaging.

13. The baseplate of claim 1 wherein the pre-swaging profile is chosen such that the flange imparts a reduced z-height variation on an attached suspension assembly component following the swaging process.

14. The baseplate of claim 1 wherein the pre-swaging profile compensates for swaging-induced deformation of the actuator arm due to compression swaging.

15. The baseplate of claim 1, wherein the pre-swaging profile compensates for swaging-induced deformation of the actuator arm due to tension swaging.

16. The baseplate of claim 1 wherein the pre-swaging profile causes the flange to impart substantially zero z-height variation on an attached suspension assembly component following the swaging process.

* * * * *

UNITED STATES PATENT AND TRADEMARK OFFICE
CERTIFICATE OF CORRECTION

PATENT NO. : 7,633,717 B1 Page 1 of 1
APPLICATION NO. : 11/384755
DATED : December 15, 2009
INVENTOR(S) : Fossum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Ninth Day of November, 2010

David J. Kappos
*Director of the United States Patent and Trademark Office*